March 4, 1941.　　J. A. SCHMITT　　2,233,852
CLEANER FOR DAIRY EQUIPMENT
Filed June 13, 1940　　2 Sheets-Sheet 1
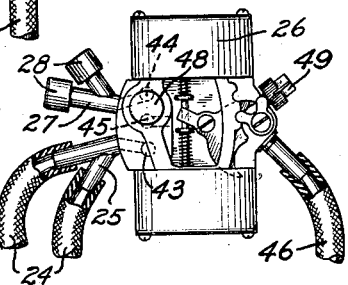
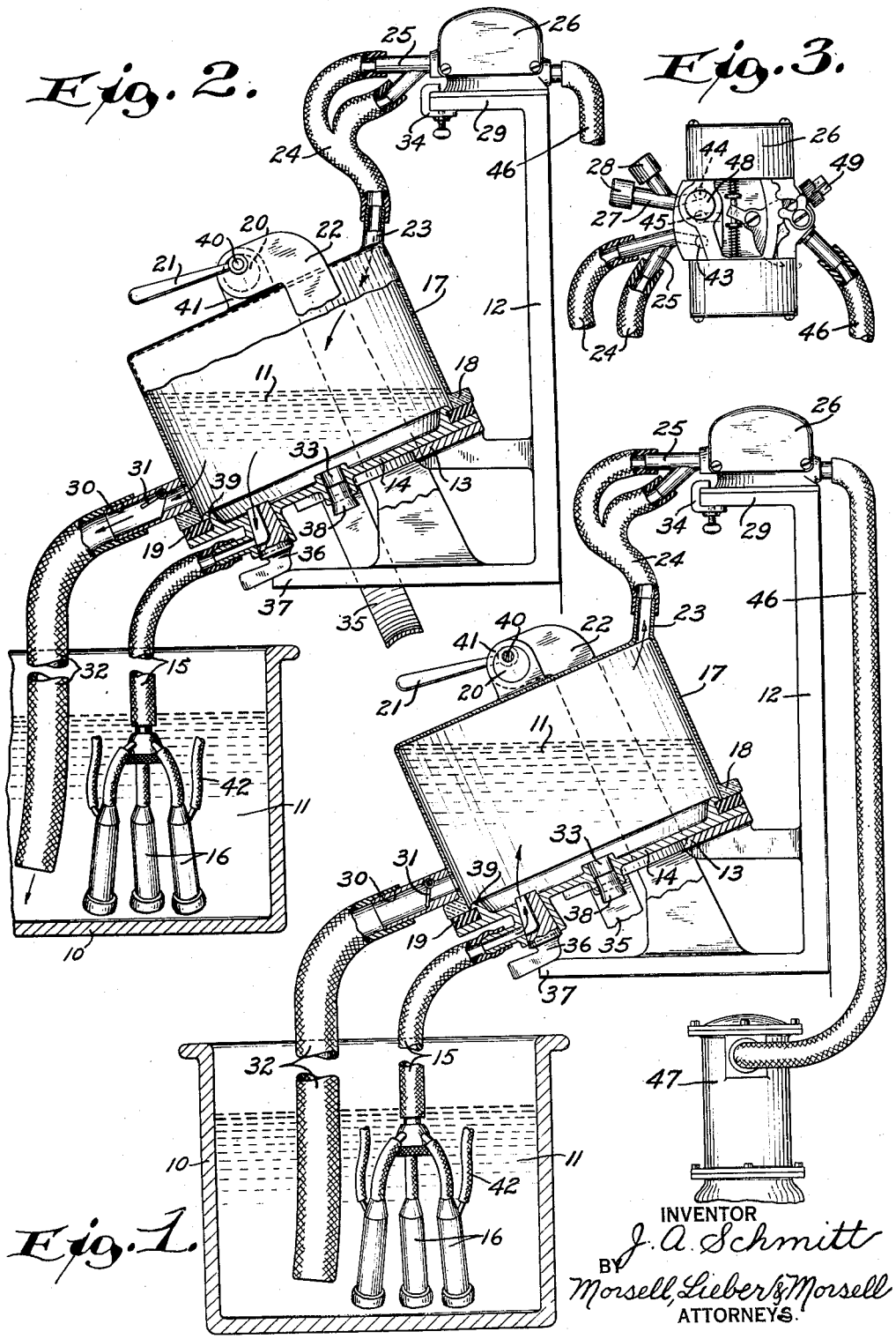
INVENTOR
J. A. Schmitt
BY Morsell, Lieber & Morsell
ATTORNEYS.

March 4, 1941.   J. A. SCHMITT   2,233,852
CLEANER FOR DAIRY EQUIPMENT
Filed June 13, 1940   2 Sheets—Sheet 2
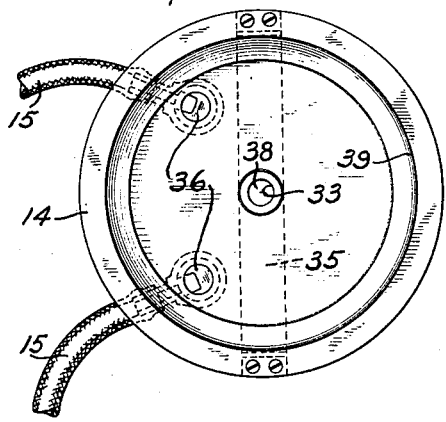
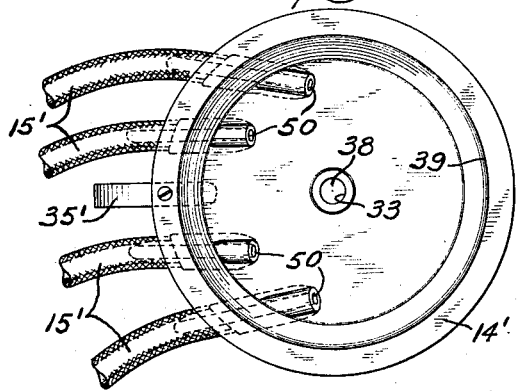
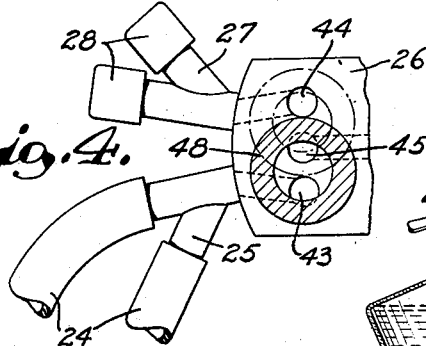
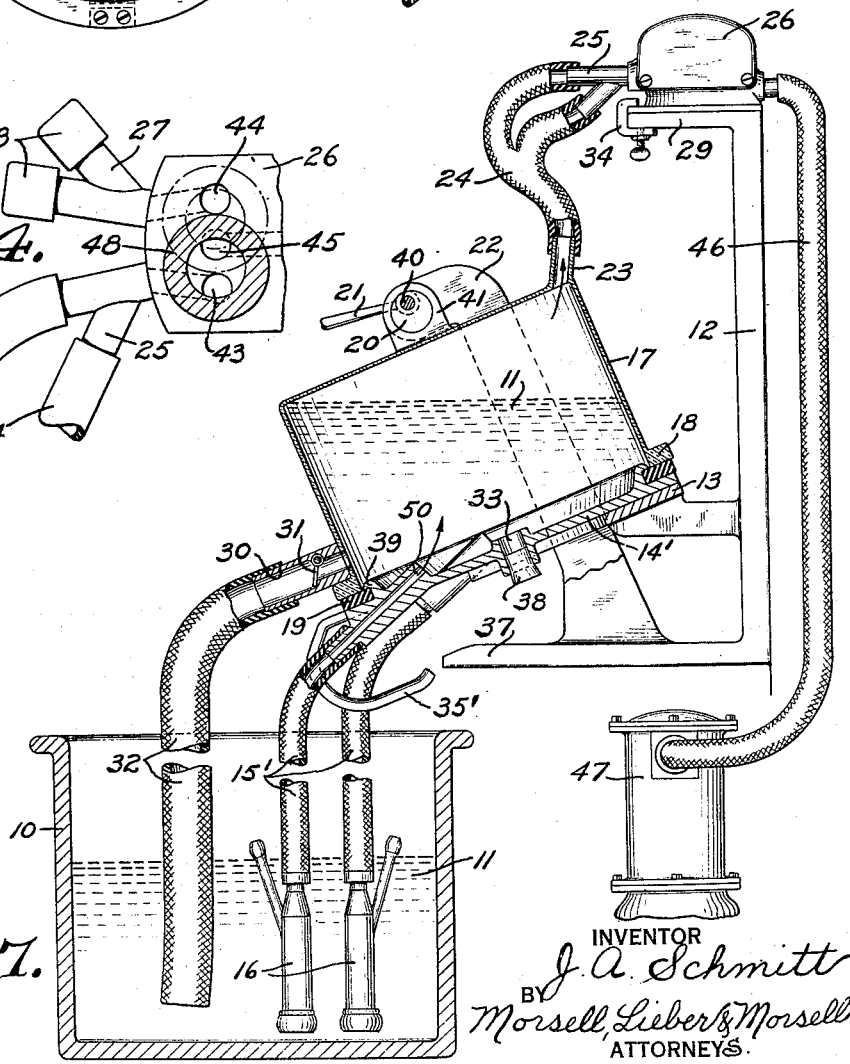
INVENTOR
J. A. Schmitt
BY Morsell, Lieber & Morsell
ATTORNEYS.

Patented Mar. 4, 1941

2,233,852

UNITED STATES PATENT OFFICE 2,233,852

CLEANER FOR DAIRY EQUIPMENT

John A. Schmitt, Waukesha, Wis., assignor to The Universal Milking Machine Company, Waukesha, Wis., a corporation of Wisconsin Application June 13, 1940, Serial No. 340,270

8 Claims. (Cl. 141—1)

My invention relates in general to improvements in the art of cleansing dairy equipment or the like, and relates more specifically to improvements in the construction and operation of apparatus for washing and sterilizing the teat cups, connecting tubes and pail lids of milking machines.

An object of the invention is to provide an improved device for cleansing the teat cups, connecting tubes and pail lids of milking machines or the like, in a most efficient and expeditious manner.

A number of different types of mechanisms have heretofore been proposed and utilized for the purpose of cleansing the teat cups and tubes of milking machines, and in several of these prior cleaning devices a vacuum pump and special valve mechanism were employed for the purpose of creating a succession of reverse flows of cleansing liquid through the teat cups and their suspension tubes from and to a bath of liquid in which the cups were submerged. In one of these prior cleaning assemblages, the teat cup suspension tubes were connected to a fixed tank the interior of which was repeatedly subjected to vacuum and to atmosphere so that liquid from the supply source was passed through the teat cups and tubes when a vacuous condition prevailed in the tank, and the liquid was returned from the tank to the supply source when a predetermined amount of liquid had been admitted thereto, as determined by a special float controlled valve associated with the tank. In another of the prior washing assemblages, the admission of liquid to the auxiliary tank from the supply source through the teat cups and tubes, and the return of the cleansing liquid to the source, were controlled by bodily moving the supplementary tank with which the vacuum pump was communicable, to thereby again operate special control valve mechanism; and both of these prior types of apparatus are extremely complicated and require considerable attention in order to maintain the same in operating condition. Aside from this objection, only one of the prior washing devices attempted to simultaneously wash and sterilize the pail covers or lids with which the teat cup suspension tubes are normally associated, and in the others it was necessary to remove these tubes from the lids and to separately cleanse the separated elements. The prior assemblages for washing the teat cups and tubes, moreover required relatively large auxiliary tanks with which the vacuum pumps were associated, did not produce effective washing action, and were undesirably complicated because they did not utilize standard milking machine parts to facilitate washing or cleansing.

It is therefore a more specific object of my present invention to provide an extremely simple, compact and readily manipulable washing device for quickly and effectively cleansing the teat cups, suspension tubes, and pail covers or lids of milking machines of various types.

Another specific object of the present invention is to provide an improved dairy equipment cleaner which will simultaneously cleanse the teat cups, hose connections, and pail lids in a most efficient manner and without necessitating separation of these elements.

A further specific object of this invention is to provide an improved unit for washing milking machine parts, which utilizes many of the standard milking machine elements in its assemblage and which can therefore be manufactured and sold at relatively moderate cost.

Still another specific object of the invention is to provide a new and useful milking machine teat cup and tube cleaning unit which is most efficient, reliable, and automatic in operation.

These and other specific objects of the invention will be apparent from the following detailed description.

A clear conception of the several features constituting my present invention, and of the mode of constructing and of utilizing dairy equipment cleaners embodying the improvement, may be had by referring to the drawings accompanying and forming a part of this specification wherein like reference characters designate the same or similar parts in the various views.

Fig. 1 is a somewhat diagrammatic vertical central section through one of the improved cleaning devices, showing the same cooperating with a standard pail lid, teat cups and connecting tubes of the type where the pail is normally disposed remote from the cow, the apparatus being shown in action with the auxiliary flushing tank under vacuum;

Fig. 2 is a view similar to that of Fig. 1, but showing the auxiliary flushing receptacle connected to atmosphere;

Fig. 3 is a top view of a standard pulsator such as is normally applied to the center opening of pail covers or lids of various types;

Fig. 4 is an enlarged fragmentatry part sectional view of the air and vacuum control mechanism of a standard pulsator, showing the same connecting the active inlet duct with the vacuum pump;

Fig. 5 is an enlarged top view of an inverted pail lid of the type shown in Figs. 1 and 2, but having two connections leading to two sets of teat cups;

Fig. 6 is a similar top view of an inverted pail lid of the type wherein the pail is normally harnessed directly to the cow; and Fig. 7 is a view similar to that of Fig. 1, but showing the improved apparatus cooperating with a pail lid of the type shown in Fig. 6.

While the improved apparatus has been shown and described herein as cooperating with only two relatively standard and well known types of milking machine assemblages, it is not my desire or intent to thereby unnecessarily limit or restrict the scope or utility of the invention. The term "pulsator" as used herein is intended to define any device which is adapted to alternately connect a space to a source of vacuum such as a pump, and to a source of higher pressure such as atmosphere, and such devices are normally utilized in milking machines of various types to produce expansion and contraction of the rubber teat cup liners commonly known as inflations.

Referring to the drawings, and more especially to Figs. 1 to 5 inclusive, the improved cleaning device for dairy equipment shown therein, comprises in general a source of cleansing liquid such as a tank 10 having sterilizing and cleansing liquid 11 therein; a frame or bracket 12 adapted to be suspended from a wall or mounted on the floor near the tank 10 and having an inclined support 13 thereon for supporting an inverted pail lid 14 in an inclined position and with the hose connections or tubes 15 thereof depending from its lower portion so that the teat cups 16 suspended from the tubes 15 will be completely submerged in the liquid 11; a relatively small auxiliary tank or transparent receptacle 17 having a bottom rim 18 coacting with a sealing gasket 19 carried by the periphery of the pail lid 14 so as to tightly close the receptacle bottom opening; clamping mechanism consisting of eccentrics 20 and one or more manipulating handles 21 associated with arms 22 on the bracket 12 for forcing the receptacle 17 against the gasket 19 and the latter against the pail lid 14; a pulsator connection 23 communicating with the uppermost portion of the receptacle 17 and being connected by a hose 24 with one branch 25 of a standard double pulsator 26, the other branch 27 of which is temporarily shut off by caps 28 or otherwise, and which may be detachably secured to a pad 29 of the bracket 12; and a duct 30 communicating with the lower portion of the interior of the receptacle 17 and having therein a one-way valve 31, the duct 30 being connected beyond the valve 31 with the supply tank 10 by means of a liquid return conduit 32.

The frame or bracket 12 may be of diverse formations, but should preferably be adapted to support and retain the lid 14, receptacle 17, and the pulsator 26 assembled as a unit; and the pulsator 26 which during normal use of the milking machine is attached to the pail lid 14 at the central opening 33 therein, may be detached from this lid and clamped to the pad 29 in any suitable manner as by clamps 34. The pail lid 14 is also provided with a manipulating bail or handle 35, and with one or more milk spigots 36 interposed between each of the teat cup suspension tubes 15 and the lid, and the bracket 12 may be provided with an extension 37 or other means coacting with the spigots 36 when the lid 14 is inverted, so as to prevent the tapered spigots from falling out of their sockets. When the pulsator 26 is attached to the pail lid 14 at the opening 33 and the lid is applied to a pail for milking purposes, the opening 33 has a check valve therein; but when the pulsator has been removed and the lid is prepared for washing, then the opening 33 should be closed by a cork or plug 38 as shown in Figs. 1 and 2. The sealing gasket 19 which may be formed of soft rubber or the like, forms part of the standard pail lid 14 and is normally secured to the lid by an annular lip 39, but may be readily removed for cleaning.

The transparent receptacle 17 which constitutes an important part of the present invention, may be formed partly or completely of glass or the like, so that the functioning of the apparatus will be plainly visible. This receptacle 17 is normally maintained in fixed or stationary condition by the bracket 12, and has relatively small liquid capacity as compared to the auxiliary tanks heretofore used in washing machines of this type. The eccentrics 20 which serve to detachably clamp the receptacle 17, gasket 19, and lid 14 together, and to hold the lid 14 in place upon the inclined support 13, may be secured to a crossshaft 40 and caused to cooperate with ears 41 secured to the top of the receptacle 17. The shaft 40 coacts with the bearings in the fixed arms 22, and the handles 21 are secured to the shaft ends, so that when the handles are swung in a counterclockwise direction as viewed in Figs. 1, 2 and 7, the rim 18 of the receptacle 17 will be forced firmly against the gasket 19, whereas reverse swinging of the handles 21 will withdraw the receptacle 17 from the gasket 19 and lid 14 and will permit free removal of the lid and gasket. When these parts are properly positioned and clamped together, the pail lid 14 will be inverted and inclined with the teat cup tubes 15 depending from the lower portion thereof; and the receptacle 17 will have its lower opening sealed by the lid 14 and the valved duct 30 should communicate with the interior of the receptacle near its lowermost portion so as to insure complete drainage of liquid 11 when atmospheric air is admitted to the receptacle. The pulsator connection 23 should communicate with the interior of the receptacle 17 at its highest portion as illustrated in Figs. 1 and 2, so that no liquid will pass through the hose 24 to the pulsator 26.

The standard pulsator 26 which normally forms a part of the ordinary commercial milking machine, may be of various types having one or more connections or branches 25, 27 which are attached to the teat cup tubes 42 during milking operations. When the pulsator 26 is used for washing and cleansing purposes, all of these branches with the exception of the branch 25, are blocked off or sealed, and both inlets of the branch 25 are connected to the receptacle connection 23 by means of a conduit or hose 24 as shown in Figs. 1 to 3 inclusive. The pulsator base has ports 43, 44 which communicate with the branches 25, 27 respectively, and also has an intermediate port 45 communicating through a hose 46 with a source of vacuum such as a standard pump 47; and a slide valve 48 which is reciprocable by the pulsator mechanism whenever the pump 47 in in operation, is adapted to alternately connect the ports 43, 44 with the vacuum port 45, while the other port 43, 44 which is not covered by the valve 48 will be opened to atmosphere. The action is clearly illustrated in the diagram of Fig. 4, wherein the valve 48 is shown in solid section connecting the port 43 and branch 25 to vacuum through the port 45, while the port 44 is open to atmosphere, but when the valve 48 is shifted to the dot-and-dash line position, the port 43 will be open to atmosphere while the port 44 will be connected to vacuum by the valve 48. The speed or stroke of the pulsator 26 may be adjusted by means of control mechanism 49, so that the period of time during which the interior of the receptacle 17 remains connected to vacuum and to atmosphere, may be varied at will, thereby permitting more or less liquid 11 to be drawn through the teat cups 16 and tubes 15 during each cycle of operation of the pulsator.

Referring more particularly to Figs. 6 and 7 of the drawings, the improved cleaning device for dairy equipment shown therein again utilizes the same type of tank 10, bracket 12 and receptacle 17 in its assemblage, but these parts are caused to cooperate with a pail lid 14' of a modified type adapted to be suspended directly from the cows and having the teat cups 16 suspended therefrom by means of relatively short individual connecting tubes 15'. The modified pail lid 14' has a central opening 33 with which a standard pulsator 26 is detachably associable as previously described, and is also provided with an annular lip 39 for retaining a sealing gasket 19. The teat cup suspension tubes 15' of the modified milking machine assemblage, are connected to ducts 50 formed in and penetrating the lid 14', so that no spigots 36 are required; and the lid 14' due to the different mode of suspending the same directly from the cows, is provided with a modified supporting handle 35'. Otherwise, the assemblages of Figs. 1 and 7 may be identical, and since the normal operation of the two asemblages is also similar, it will suffice to specifically describe the operation of one assemblage.

During normal operation of the improved washing and sterilizing assemblage specifically illustrated in Figs. 1, 2 and 3, and assuming the washing equipment to have been properly prepared, the teat cups 16 will be submerged in an abundant supply of fresh washing liquid 11 disposed within the tank 10. The control mechanism 49 of the pulsator 26 should be adjusted to produce the desired operation of the pulsator, and the receptacle 17 should be firmly clamped against the inverted pail lid 14 with the aid of the eccentrics 20 and the handles 21. The vacuum pump 47 may then be placed in operation and when the slide valve 48 of the pulsator 26 is effective to connect the port 43 with the vacuum port 45, the interior of the receptacle 17 will be subjected to vacuum and liquid from the tank 10 will be drawn through the teat cups 16 and tubes 15, and through the spigots 36 into the interior of the auxiliary receptacle, as specifically shown in Fig. 1. When the valve 48 is shifted to the position shown in Fig. 3 so as to open the port 43 to atmosphere, then atmospheric pressure will be established within the receptacle 17 through the branch 25, hose 24 and connection 23, and liquid will be permitted to flow by gravity from within the receptacle 17 through the spigots 36, tubes 15, and teat cups 16 into the tank 10. Due to the hydrostatic head of liquid within the reservoir 17, excess liquid which cannot flow by gravity through the spigots 36 and tubes 15, will open the valve 31 as shown in Fig. 2, and will escape into the tank 10 through the conduit 32. The liquid will thus quickly escape from within the receptacle 17 and will return to the tank 10, and that liquid which passes through the tubes 15 and teat cups 16 will effectively flush the interiors of these elements. It is to be noted that during the periods when the interior of the receptacle 17 is subjected to vacuum, the one-way valve 31 will remain closed and all of the liquid entering the receptacle 17 must therefore pass through the teat cups 16, connecting tubes 15, and the spigots 36. The flushing action of the liquid entering and leaving the receptacle 17 will obviously cleanse the pail lid 14 as well as the teat cups and connecting tubes, and when the vacuum pump 47 is stopped or the operation of the pulsator 26 is arrested so as to leave the port 43 in open communication with the atmosphere, then all liquid 11 will drain from within the receptacle 17, and this receptacle may thereafter be removed to permit removal of the pail lid 14 with its associated elements. The washing action is constantly visible through the transparent walls of the receptacle 17, and may be continued until the milking machine parts have been thoroughly cleansed. The washing action will obviously continue so long as the parts remain assembled as shown in Figs. 1 and 2, and as previously indicated, the pulsator 26 may be quickly adjusted to introduce the desired amount of liquid 11 into the receptacle 17 during each successive pulsation.

From the foregoing description it will be apparent that my present invention provides a dairy equipment cleaner which is extremely simple and compact in construction and which is moreover highly efficient in operation. The improved assemblage is adapted to produce relatively short and rapidly successive pulsations and to thereby subject the milking machine parts to repeated flushing action by virtue of the rapid flow therealong and therethrough. Because of the fact that standard milking machine parts such as the pulsator 26 and lids 14, 14' may be utilized in the washing assemblage or unit, the cost of production of the washing mechanism is reduced to a minimum. The washing mechanism may be quickly and readily assembled and the unit may be suspended from a wall or otherwise disposed, and occupies relatively small space because of its extremely compact construction. While the improved mechanism is adapted to effectively cleanse the teat cups and connecting tubes, it is also adapted to simultaneously cleanse the pail lids, and since the receptacle 17 and the lid 14 are maintained stationary during the washing operation, the entire construction can obviously be reduced to relatively simple form and requires no complicated elements such as valve mechanisms which are apt to become inoperative. The improved unit has proven highly successful in actual use, and is entirely automatic in operation after having been properly assembled and adjusted.

It should be understood that it is not desired to limit this invention to the exact details of construction or to the precise mode of use, herein shown and described, for various modifications within the scope of the claims may occur to persons skilled in the art.

I claim:

1. A cleaning device for the teat cups and connecting tubes and pail lid of a milking machine, said device being of the type wherein the teat cups are submerged in a supply of cleansing liquid and comprising, a receptacle having an open bottom adapted to be closed by an inverted pail lid from which the teat cups are suspended by the connecting tubes, a pulsator connection communicable with the upper portion of said receptacle, and an excess liquid discharge duct communicable with the lower portion of said receptacle and having therein means for permitting escape of liquid from said receptacle to said supply when the interior of the receptacle is open to atmosphere and for preventing such escape when the receptacle is under vacuum.

2. A cleaning device for the teat cups and connecting tubes and pail lid of a milking machine, said device being of the type wherein the teat cups are submerged in a supply of cleansing liquid and comprising, a receptacle having an open bottom adapted to be closed by an inverted pail lid from which the teat cups are suspended by the connecting tubes, a pulsator connection communicable with the upper portion of said receptacle, and an excess liquid escape duct connecting the lower portion of said receptacle with the cleansing liquid supply and having therein a one-way valve for permitting escape of liquid from said receptacle to said supply only when the interior of said receptacle is exposed to atmosphere and for preventing such escape when the receptacle is under vacuum.

3. A cleaning device for the teat cups and connecting tubes and pail lid of a milking machine, said device being of the type wherein the teat cups are submerged in a supply of cleansing liquid and comprising, means for fixedly supporting a pail lid with the teat cups suspended therefrom by the connecting tubes, a receptacle having an open bottom adapted to be sealed by the pail lid coacting with said supporting means, a pulsator connection communicable with the upper portion of said receptacle, an excess liquid discharge duct communicable with the lower portion of said receptacle, and valve means in said duct for permitting escape of liquid from said receptacle to said supply only when the interior of said receptacle is under atmospheric pressure.

4. A cleaning device for the teat cups and connecting tubes and pail lid of a milking machine, said device being of the type wherein the teat cups are submerged in a supply of cleansing liquid and comprising, means for fixedly supporting a pail lid inverted and in an inclined position with the teat cups suspended from a lower portion thereof by the connecting tubes, a receptacle adapted to be supported upon and sealed by the pail lid coacting with said supporting means, a connection communicating with the upper portion of said receptacle, a pulsator communicating with said connection and being operable to alternately establish vacuum and atmospheric pressure within said receptacle, and a liquid discharge connection communicable with the lower portion of said receptacle and having therein valve means for permitting escape of excess liquid from said receptacle only when the interior thereof is under atmospheric pressure.

5. A cleaning device for the teat cups and connecting tubes of a milking machine while the tubes remain attached to the pail lid, said device being of the type wherein the teat cups are submerged in a supply of cleansing liquid and comprising, means for fixedly and detachably supporting a pail lid with the teat cup suspension tubes depending from the lowest portion of the lid, a receptacle detachably attachable to the fixed lid and having a pulsator connection at the uppermost portion thereof, a pulsator communicable with said connection, and an excess liquid discharge duct communicable with said receptacle only when the interior thereof is under atmospheric pressure.

6. A cleaning device for the teat cups and connecting tubes of a milking machine while the tubes remain attached to the pail lid, said device being of the type wherein the teat cups are submerged in a supply of cleansing liquid and comprising, means for fixedly and detachably supporting a pail lid with the teat cup suspension tubes depending from the lowest portion of the lid, a receptacle detachably attachable to the fixed lid and having a pulsator connection at the uppermost portion thereof, a pulsator communicable with said connection, an excess liquid discharge duct leading from the lower portion of said receptacle to the supply, and a valve in said duct for permitting escape of liquid therethrough only when the interior of said receptacle is under atmospheric pressure.

7. A cleaning device for the teat cups and connecting tubes and pail lids of a milking machine, said device being of the type wherein one or more teat cups are submerged in a supply of cleansing liquid and comprising, a receptacle having an opening in its lower portion adapted to be closed by a pail lid from which the teat cups are suspended by connecting tubes, a pulsator connection communicable with an upper portion of said receptacle, and an excess liquid discharge duct communicable with a lower portion of the receptacle and being provided with means for permitting escape of liquid from said receptacle when the interior thereof is open to atmosphere and for preventing such escape when the receptacle interior is under vacuum.

8. A cleaning device for the teat cups and connecting tubes and pail lids of a milking machine, said device being of the type wherein one or more teat cups are submerged in a supply of cleansing liquid and comprising, a receptacle having an opening in its lower portion adapted to be closed by an inclined pail lid from the lower portion of which the teat cups are suspended by connecting tubes, a pulsator connection communicable with an upper portion of said receptacle, and an excess liquid discharge duct communicable with said receptacle near the lower portion of the inclined lid and being provided with valve means for permitting escape of liquid from said receptacle when the interior thereof is open to atmosphere and for preventing such escape when the receptacle interior is under vacuum.

JOHN A. SCHMITT.